United States Patent
Fujii et al.

(10) Patent No.: US 6,336,316 B1
(45) Date of Patent: Jan. 8, 2002

(54) HEAT ENGINE

(75) Inventors: Shoichi Fujii; Yoshiharu Tsujikawa, both of Osaka; Kenichi Kaneko, Sakai, all of (JP)

(73) Assignee: Japan Science and Technology Corp., Saitama (JP)

( * ) Notice: Subject to any disclaimer, the term of this patent is extended or adjusted under 35 U.S.C. 154(b) by 0 days.

(21) Appl. No.: 09/622,693

(22) PCT Filed: Jun. 3, 1999

(86) PCT No.: PCT/JP99/02976

§ 371 Date: Sep. 18, 2000

§ 102(e) Date: Sep. 18, 2000

(87) PCT Pub. No.: WO00/37785

PCT Pub. Date: Jun. 29, 2000

(30) Foreign Application Priority Data

Dec. 21, 1998 (JP) ................................................ 363073

(51) Int. Cl.[7] ............................................. F02C 3/10
(52) U.S. Cl. .................................. 60/39.161; 60/39.41
(58) Field of Search ........................... 60/39.161, 39.41, 60/731

(56) References Cited

U.S. PATENT DOCUMENTS

| 4,502,277 A | * 3/1985 | Papastavros ............... 60/39.41 |
| 6,134,876 A | * 10/2000 | Hines et al. ............... 60/39.41 |

FOREIGN PATENT DOCUMENTS

| JP | 38-353 | 1/1963 |
| JP | 54-163207 | 12/1979 |
| JP | 6-200705 | 7/1994 |
| JP | 11-355531 | 12/1999 |

OTHER PUBLICATIONS

Y. Tsujikawa et al. "Utilization of Cyrogenic Exergy of LNG by MGT (Mirror Gas Turbine)" *The American Society of Mechanical Engineers* presented at the Int'l Gas Turbine & Aeroengine Congress & Exhibition, Munich, Germany, May 8–11, 2000, pp. 1–7.

Y. Tsujikawa et al. "Conceptual Study on MGT (Mirror Gas Turbine) Cycle" *Proceedings of the International Gas Turbine Congress* Kobe, Japan, Nov. 14–19, 1999, pp. 405–410.

K. Otani "The Exhaust Heat Recovery by the Inverted Brayton Cycle" *Gas Turbine Society of Japan* vol. 27, No. 5, 1999.9, pp. 64–71.

Y. Tsujikawa et al., "Conceptual Recovery of Exhaust Heat from a Conventional gas Turbine by an Inter–cooled Inverted Brayton Cycle" *The American Society of Mechanical Engineers* presented at the Int'l Gas Turbine & Aeroengine Congress & Exhibition, Indianapolis, Indiana, Jun. 7–10, 1999, pp. 1–8.

International Search Report for PCT/JP99/02976 date Aug. 10, 1999 (PCT/ISA/210 and PCT/ISA/220).

* cited by examiner

*Primary Examiner*—Louis J. Casaregola
(74) *Attorney, Agent, or Firm*—Smith, Gambrell & Russell LLP

(57) ABSTRACT

A heat engine is provided that can improve thermal efficiency of a gas turbine. When gas such as air enters a compressor C101 of a gas turbine apparatus 100 (state 1), the gas becomes high-temperature gas by a combustor B102 (state 3) and moves toward a turbine T103. Another turbine T104 is placed at the back portion of the turbine T103 where air of state 3 enters, the gas enters a first heat exchanger Hx 105 (state 4) and is supplied to a compressor C109 (state 5). Thereafter, the supplied gas is discharged from a compressor C112 (state 12) through a heat exchanger Hx106 of an intercooling portion 151, a compressor C110, a heat exchanger Hx107, a compressor C111, and a heat exchanger Hx108 (states 6 to 11).

7 Claims, 23 Drawing Sheets

HEAT ENGINE

FIELD OF THE INVENTION

The present invention relates to a heat engine, more particularly to a heat engine in which a power generating apparatus is placed and operates in the exhaust gas of topping cycle, and compressor/combustor/turbine of a gas turbine and turbine/cooler/compressor of the power generating apparatus are operated simultaneously in such a manner that their permutations of components are opposite as if a mirror surface was virtually set between both cycles.

BACKGROUND OF INVENTION

Users of gas turbines have spread in many other sectors than aeroengines originally used, which include land industries, marines, vehicles and electric power generation in recent years, and their improvements in thermal efficiency and simplification of the structure have been carried out.

In order to raise the thermal efficiency of industrial gas turbines, there are two main systems. One is a "combined cycle" that passes water through the exhaust gas of gas turbines to generate steam for a steam turbine, and to increase outputs. The other is a "regeneration cycle" that returns an amount of exhaust heat energy to an outlet of the compressor of gas turbines to increase an air temperature in front of combustor and then to reduce input fuel. The combined cycle is used in the large-sized gas turbines such as a power plant, and the regeneration cycle is mainly used in the medium and small-sized gas turbines.

Moreover, since natural gas, which has been largely started to use recently, is carried in at cryogenic liquid state by ship from abroad in Japan, it must be vaporized in order to use it as fuel. At present, such vaporization is carried out by use of sea water. However, since temperature of sea water drops several degrees, the sea water must be heated up to the original temperature and then returned to the sea in consideration of influence on the ecosystem. There may be sometimes a case that an LNG cryogenic power generation of Rankine cycle is employed by using the difference in temperature between sea water and liquid natural gas, which is about 180 degrees.

The above-described combined cycle system, that is, the system using both of a gas turbine and a steam turbine, which is widely used in the power plant, becomes established worldwide as an effective system for increasing overall thermal efficiency. However, the combined cycle system needs large-sized facilities including a boiler with considerable costs attendants particulary for steam turbines. Moreover, the combined cycle cannot be always operated at an optimum pressure ratio because of the limited temperature of the metallic surface of the boiler that generates steam.

On the other hand, the regeneration cycle system, which is used to improve the thermal efficiency of the medium and small-sized gas turbines, requires a heat exchanger resisting high temperature in the exhaust gas, where the temperature difference to be used for the heat exchange is low, so that high exchange temperature efficiency cannot be expected. Furthermore, in the system where a compression ratio of gas turbines increases, it becomes very difficult to have an efficient heat exchange.

The present invention can be applied to a natural gas manufacture. In the conventional liquid natural gas manufacturing technique, the LNG cryogenic power generation, which uses the temperature difference of about 180 degrees between sea water and liquid gas, so as to generate power by Rankine cycle by use of chlorofluorocarbon, has been tried. However, in the conventional technique, since power generation efficiency is low by a few percent and chlorofluorocarbon is used as a working medium, this system is on the decline.

SUMMARY OF THE INVENTION

One object of the present invention is to eliminate the drawback of the above-mentioned system to improve the thermal efficiency of gas turbines. In addition, another object of the present invention is to carry out natural gas manufacturing and power generation simultaneously at higher efficiency than ever made.

The other object of the present invention is to provide a heat engine wherein thermal efficiency is increased by mainly using the known components whose manufacturing method is established and newly combining the respective components, and to contribute to carbon dioxide reduction effect around the world.

The heat engine of the present invention is characterized by that a power generating apparatus, which makes high temperature gas of normal pressure or pressure close to normal pressure to flow into a turbine, and then performs heat exchange to lower temperature of gas in front of an inter cooled compressor, is placed and operated in the ehaust gas of topping cycle, and compressor/combustor/turbine of a gas turbine and turbine/cooler/compressor of the power generating apparatus are operated simultaneously in such a manner that their permutations of components are opposite as if a mirror surface was set virtually between both cycles. The power generating apparatus of the present invention is of the heat engine that actuates by two cycles reflected on a mirror surface, and works as a bottoming cycle of expansion/cooling/compression, which are opposite to the processes of compression/heating/expansion performed by the normal gas turbines.

In addition, the present invention can be used in place of the combined cycle with a large-sized steam turbine or the regeneration cycle of the medium and small-sized gas turbines which is generally used for general industries or vehicles. Moreover, the application of cooling in the present invention to the liquid natural gas manufacturing makes it possible to realize gasification and power generation simultaneously.

According to the first solving means of the present invention, a heat engine is provided which comprises:
  a gas turbine having a first compressor, a combustor, and a first turbine; and
  a power generating apparatus having:
    a second turbine attached to the back portion of exhaust gas of said gas turbine, and said second turbine into which high-temperature exhaust gas is made to flow from said first turbine at normal pressure or pressure close to the normal pressure;
    a cooler into which exhaust gas is made to flow from said second turbine to perform heat exchange, whereby reducing the temperature of exhaust gas;
    a second compressor into which exhaust gas is made to flow from said cooler; and
    an inter cooled portion into which exhaust gas is made to flow from said second compressor to perform heat exchange.

Moreover, according to the present invention, the intercooling section of the power generating apparatus comprises an intercooler into which exhaust gas is made to flow in the second compressor to perform heat exchange for reducing the temperature of gas, and one or a plurality of intercoolers having inter compressor into which exhaust gas is made to flow from the intercooler.

DESCRIPTION OF THE INVENTION (1) First embodiment

Figure 1:
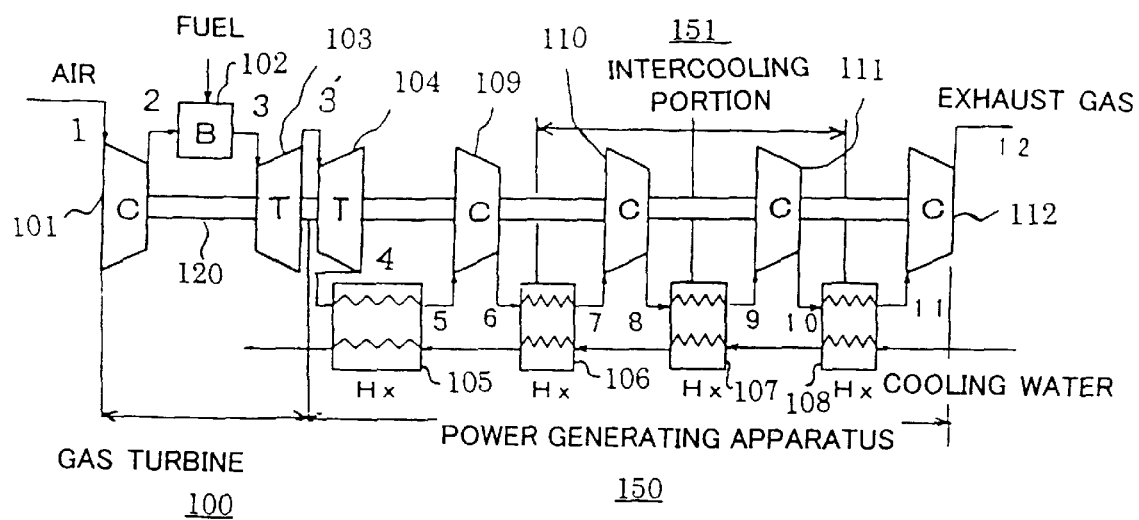
FIG. 1 is a constitutional view of a first embodiment of a heat engine according to the present invention.

FIG. 1 is a conceptual view of a first embodiment of a heat engine relating to the present invention. This heat engine comprises a gas turbine 100 and a power generating apparatus 150. The gas turbine 100 and power generating apparatus 150 are directly or indirectly connected to each other by a shaft 120. This shaft 120 can connect a load such as a electric generator. The gas turbine 100 comprises a compressor C101, a combustor B102, and a turbine T103. The power generating apparatus 150 comprises a turbine T104, compressors C 109 to 112 and heat exchangers Hx 105 to 108. The number of stages of combinations of compressors C 109 to 112, and heat exchangers Hx 105 to 108 is four in the description of FIG. 1. However, the number of stages may be basically two or more, and the suitable number may be provided. In the figure, compressors C 110 to 111 and heat exchangers Hx 106 to 108 have a function as an intercooling portion 151. Moreover, in FIG. 1, when the power generating apparatus 150 is attached to the gas turbine apparatus 100, both shafts are directly connected to each other, but they are not always directly connected to each other and they may be separately provided to be independent of each other. In the latter case a kind of flow diffusers are needed between turbines 103 and 104.

The turbines T103 and 104 convert fluid energy to shaft power, so that temperature of fluid and pressure drop when it passes through turbine blades. The compressors C109 to 112 provide energy to fluid by use of the shaft power output by the turbine T104, so that pressure of fluid and temperature increase when it passes through compressor blades. The heat exchangers Hx 105 to 108 divide two fluids having a temperature difference by, for example, a metallic surface and provide high-temperature heat energy to low-temperature fluid without mixing two fluids by use of heat conduction. The combustor B102 burns fuel to heat air from the compressor C101.

Next, the operation of this heat engine will be explained. Numeric characters 1 to 12 in FIG. 1 show gas thermodynamic states in the present invention. When gas such as air enters the compressor C101 of gas turbine 100 (state 1), the gas becomes high-temperature gas by the combustor B102 (state 3) and moves toward the turbine T103. Another turbine T104 is placed at the back portion of the turbine T103 where air of state 3 enters, and the gas enters the first heat exchanger Hx 105 (state 5). Thereafter, the supplied gas is discharged from the compressor C109 (state 6) through the heat exchanger Hx106 of intercooling portion 151, compressor C110, heat exchanger Hx 107, compressor C111, and heat exchanger Hx 108 (states 6 to 11). The turbine T104 for power generation provided in the power generating apparatus 150 shown in FIG. 1 is drawn with the same outer diameter as that of the turbine T103 provided in the gas turbine apparatus 100. However, the turbine T104 can be designed to have an outer diameter, for example, 1.4 to 1.7 times larger than that of turbine T103 in order to prevent axial flow velocity from being increased excessively.

Figure 2:
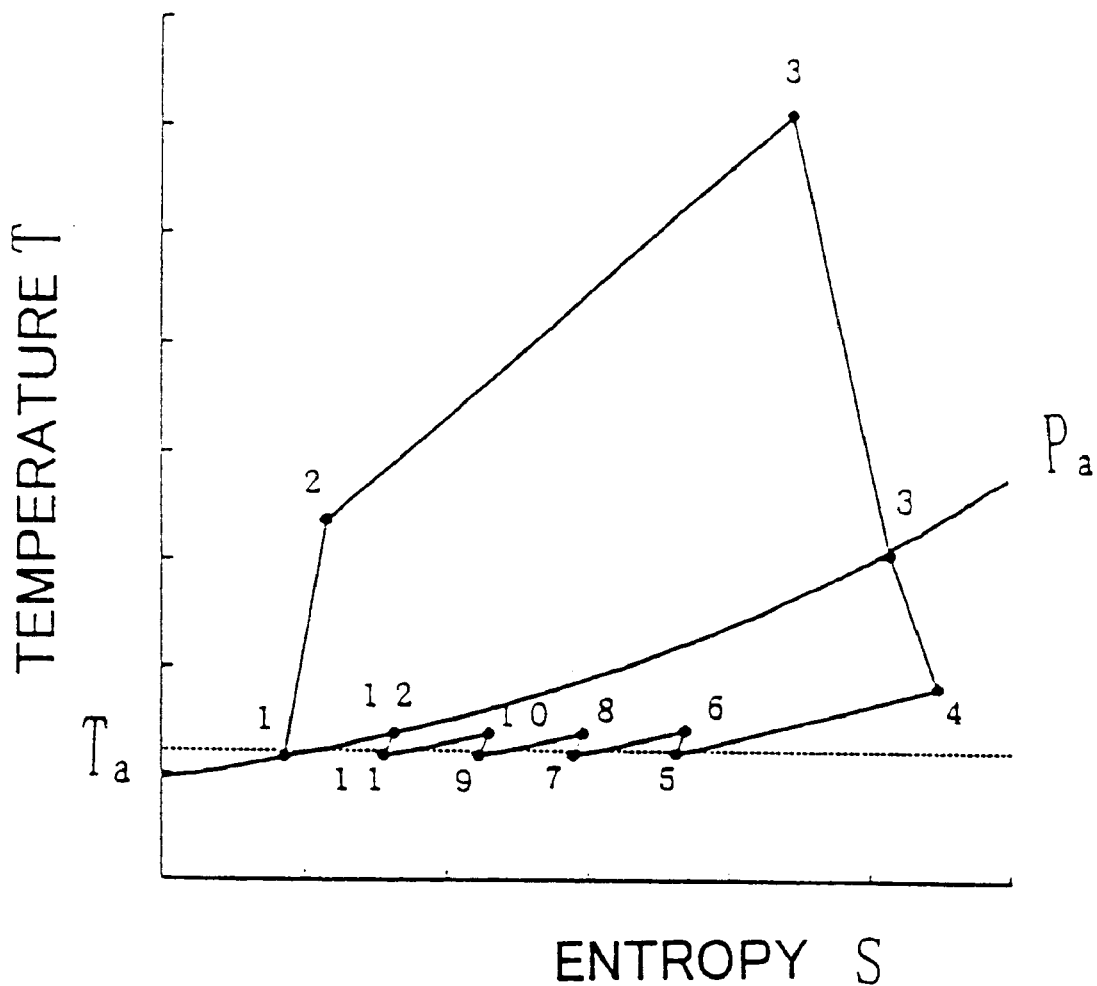
FIG. 2 is a temperature T/entropy S diagram showing thermodynamic state of gas.

FIG. 2 shows a temperature T/entropy S diagram showing gas thermodynamic state. FIG. 2 explains a flow of fluid in FIG. 1 and a change in thermodynamic state. Numeric characters in the figure correspond to the respective states of FIG. 1. In the figure, Pa is an atmospheric pressure, and Ta is an atmospheric temperature or an environmental temperature. In comparison between FIGS. 1 and 2, the gas becomes less than atmospheric pressure, passes through the heat exchanger Hx105, and is returned to state 5, which is the environmental temperature Ta. Here, the gas is compressed, and the temperature reduction to atmospheric temperature Ta is repeated four times by the heat exchangers Hx106 to 108 in states 6 to 11, and the gas is discharged to atmosphere in state 12.

(2) Second embodiment

Figure 3:
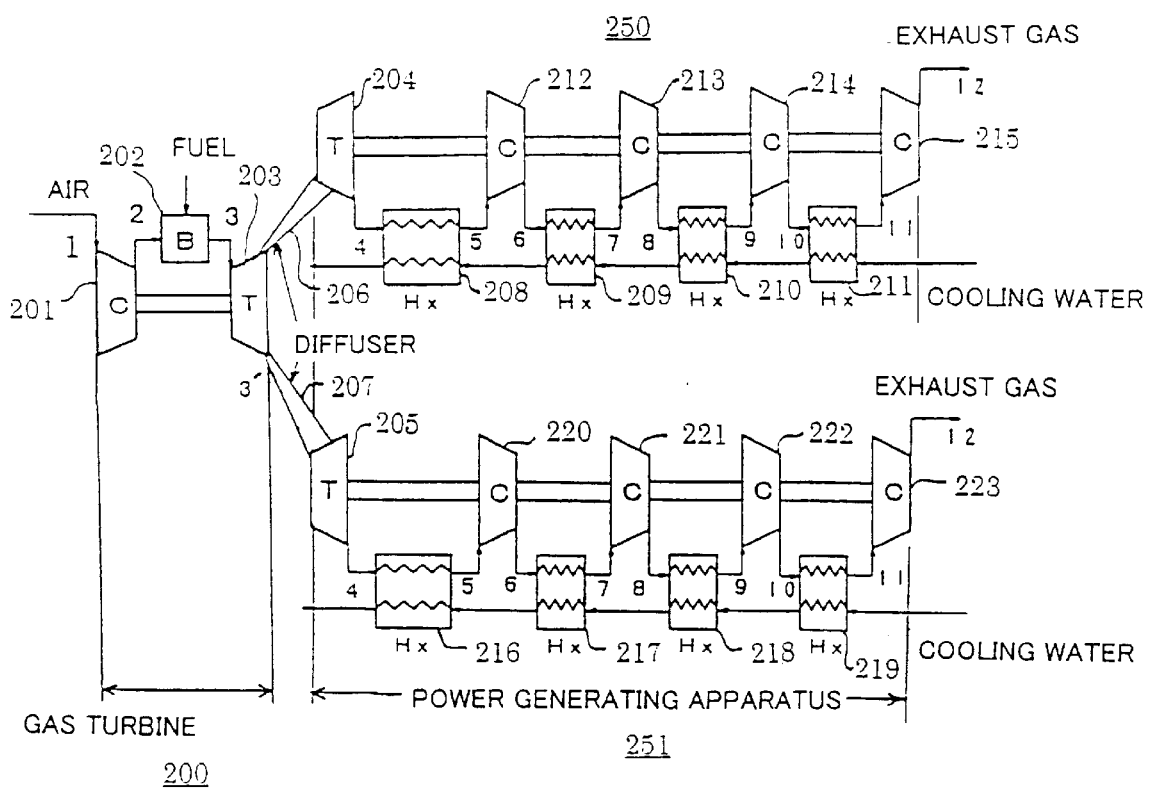
FIG. 3 is a constitutional view of a second embodiment of a heat engine according to the present invention.

Next, FIG. 3 is a conceptual view of a second embodiment of a heat engine relating to the present invention.

FIG. 3 is the conceptual view of the embodiment in the case where a plurality of power generating apparatuses of heat engine of FIG. 1 is provided. This heat engine comprises a gas turbine 200, a plurality of power generating apparatuses 250 and 251, and diffusers 206 and 207. The structure of gas turbine 200 and the power generating apparatuses 250 and 251 are the same as those of FIG. 1. The diffusers 206 and 207 connect the gas turbine 200 to the respective power generating apparatuses 250 and 251. The diffusers 206 and 207 have a function to expand a flow channel area gradually in order to reduce the flow velocity therein.

FIG. 3 explains the case in which the power generating apparatuses 250 and 251 are composed of two lines, respectively. However, a suitable number of lines can be provided. In the case where the plurality of power generating apparatuses 250 and 251 is provided, the number of diffusers 206 and 207, which respectively connect the gas turbine 200 to the power generating apparatuses 250 and 251, is increased in accordance with the number of power generating apparatuses. Moreover, in the largesized gas turbine 200 as shown in FIG. 3, the provision of a plurality of power generating apparatuses makes it possible to minimize the increase in the outer diameter of each of the turbine and compressor in the power generating apparatuses.

(3) Experimental example of power generating apparatus

The present invention is one that combines the gas turbine and power generating apparatuses, and a basic experimental example in which only power generating apparatuses are taken up will be explained below. This experiment makes it possible to confirm that the present invention is established from the engineering point of view.

Figure 4:
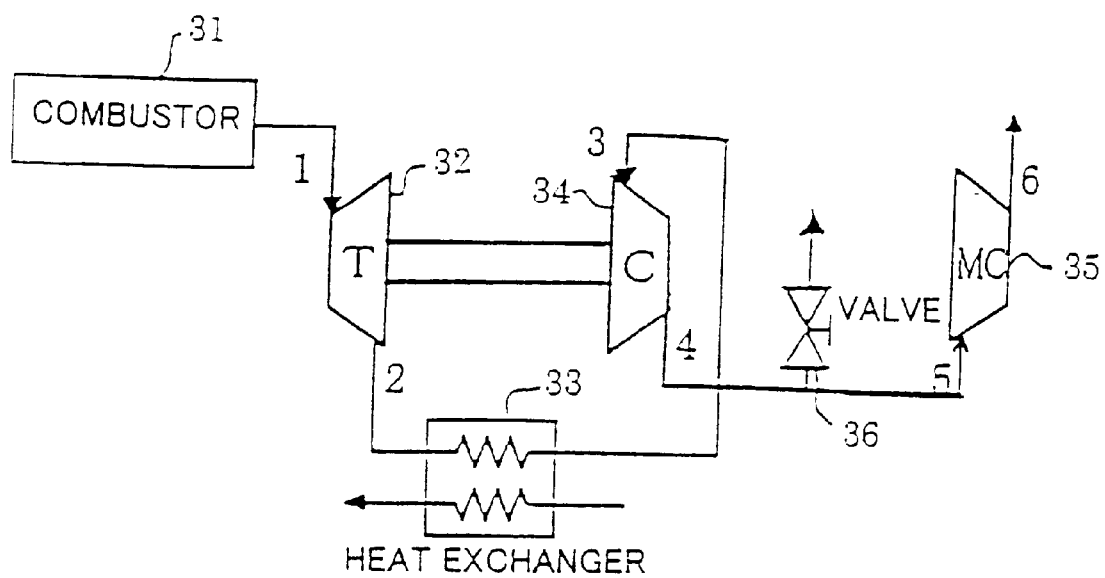
FIG. 4 is an explanatory view of the test rig showing the principle of the power generating apparatus according to the present invention.

FIG. 4 is an explanatory view showing the principle of the power generating apparatus relating to the present invention. The power generating apparatus of FIG. 4 comprises, as an example, a centrifugal turbine T32, a centrifugal compressor C34, a water- cooling heat exchanger 33, and a compressor MC 35 with an electric motor. The experiment was performed using the centrifugal turbine T32 with an outer diameter of, for example, 30 mm. The compressor MC 35 with an electric motor serves as an aerodynamic starter. Generally, a mechanical starter is attached to the processed shafts of the turbine and compressor, and generators further attached thereto as a common way. However, in consideration of the cost, the formation as shown in the figure has been made.

Next, an explanation of the operation of this power generating apparatus will be given. Premixed gas of city gas and air is sent to a combustor 31 with swirl, and ignition is performed to generate high-temperature gas, and the gas is sucked by the compressor MC 35 with an electric motor so as to increase revolutions gradually. The number of revolutions is measured using the line of magnetic force of a magnet immersed into the blade of centrifugal compressor C34, and controlled by the turbine inlet temperature and the suction of compressor MC 35 with an electric motor. When the number of revolutions reaches a sufficiently high value (for example, about 250,000 per minute), a valve 36 attached to the pipeline, which is provided between the compressor MC 35 with an electric motor and centrifugal compressor C34, is opened gradually, and the compressor MC 35 with an electric motor is completely stopped as the outlet of centrifugal compressor C34 is brought close to an air opening. At this time, the number of revolutions of centrifugal turbine T32 drastically decreases, but the outlet of centrifugal compressor C34 is changed from the negative state to atmospheric state when the number of revolutions is decreased to some degree. In this case, if the output of centrifugal turbine T32 and the necessary horsepower of centrifugal compressor C34 are kept in balance, the power generating apparatus can rotate in an idling state. In addition, if the input of fuel is reduced to decrease the turbine inlet temperature, it is possible to perform self-sustaining at lower revolutions. In the experimental example, the lowest temperature at which this system performs self-sustaining was desirably 975K. The lowest temperature is the one at which the number of revolutions cannot be maintained constantly if the temperature goes below it, and the lowest temperature can be appropriately set in accordance with the system structure.

Figure 5:
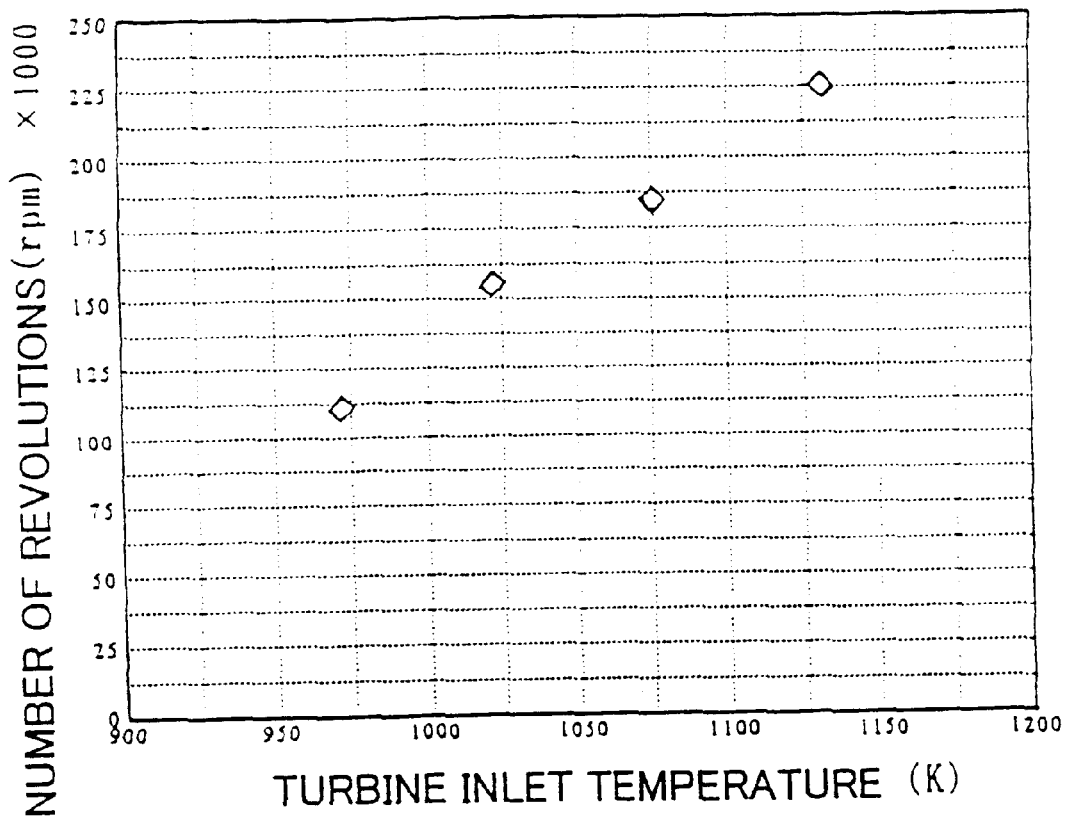
FIG. 5 is the experimental data of turbine inlet temperature and idling revolution in the power generating apparatus of FIG. 4.

FIG. 5 is the characteristics of the turbine inlet temperature and a self-sustaining revolution in the power generating apparatus of FIG. 4. This figure shows that the number of revolutions is increased if the turbine inlet temperature is increased.

Figure 6:
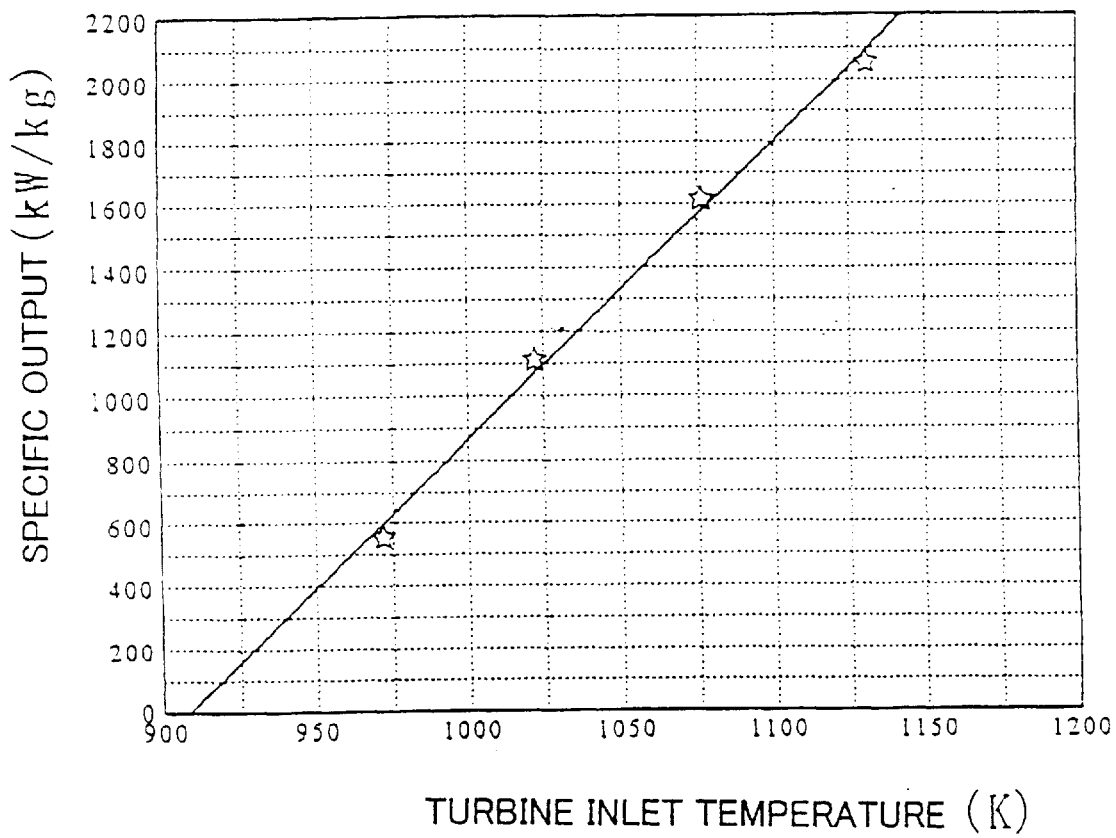
FIG. 6 is the experimental data of specific output and turbine inlet temperature during the idling operation in the power generating apparatus of FIG. 4.

FIG. 6 is the characteristics of the specific output and turbine inlet temperature during the idling in the power generating apparatus of FIG. 4. From this figure, it can be seen that the specific output is increased if the turbine inlet temperature is increased.

Figure 7:
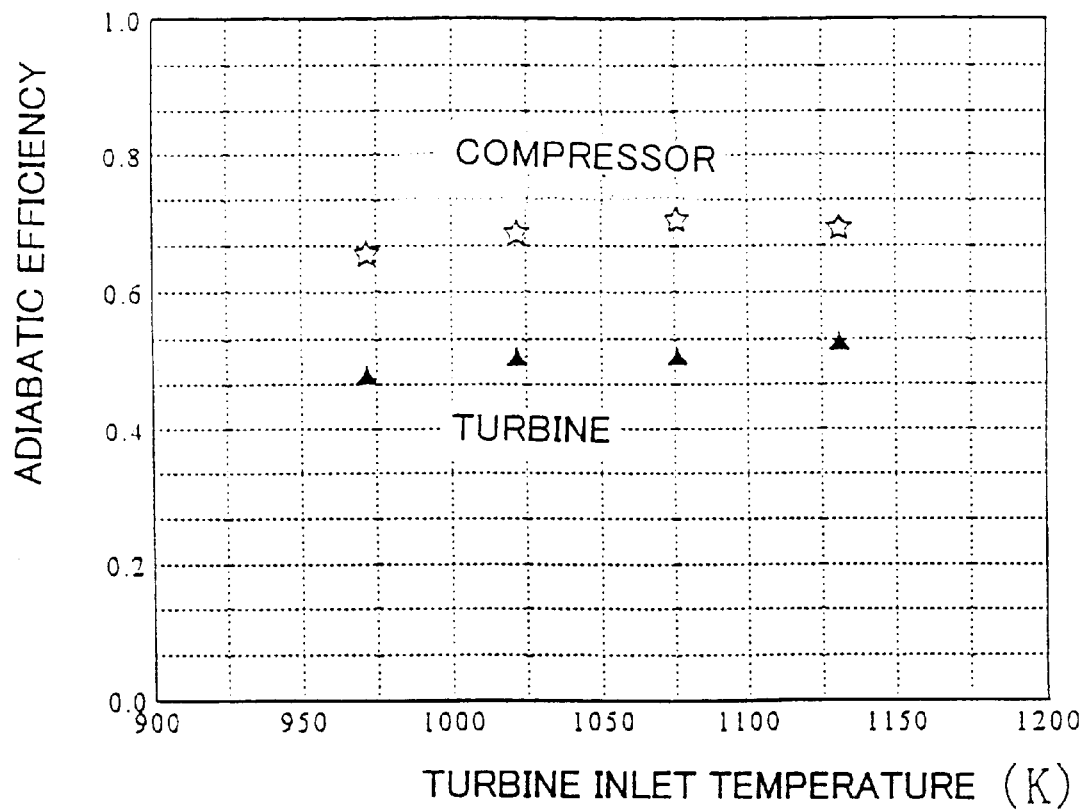
FIG. 7 is the experimental data of the turbine inlet temperature and adiabatic efficiency of compressor and turbine of the test rig in the power generating apparatus of FIG. 4.

FIG. 7 is a characteristic diagram of the turbine inlet temperature and adiabatic efficiency in the power generating apparatus of FIG. 4. FIG. 7 shows the relationship between the turbine inlet temperature of turbine T32 used in the experiment and adiabatic efficiency of compressor C34.

In the above experimental example, when the inlet of turbine T32 was maintained at 30 mmHg which is a little higher than atmospheric pressure, combustion was performed. In addition, when the same 30 mm Hg was applied to the inlet of turbine T32 at the non-combustion time, the turbine T32 worked a little, and the outlet pressure became 3 mm Hg. This pressure was directly applied to the compressor C34, and the compressor C34 functioned like a turbine, and 10,000 rpm were performed.

Figure 8:
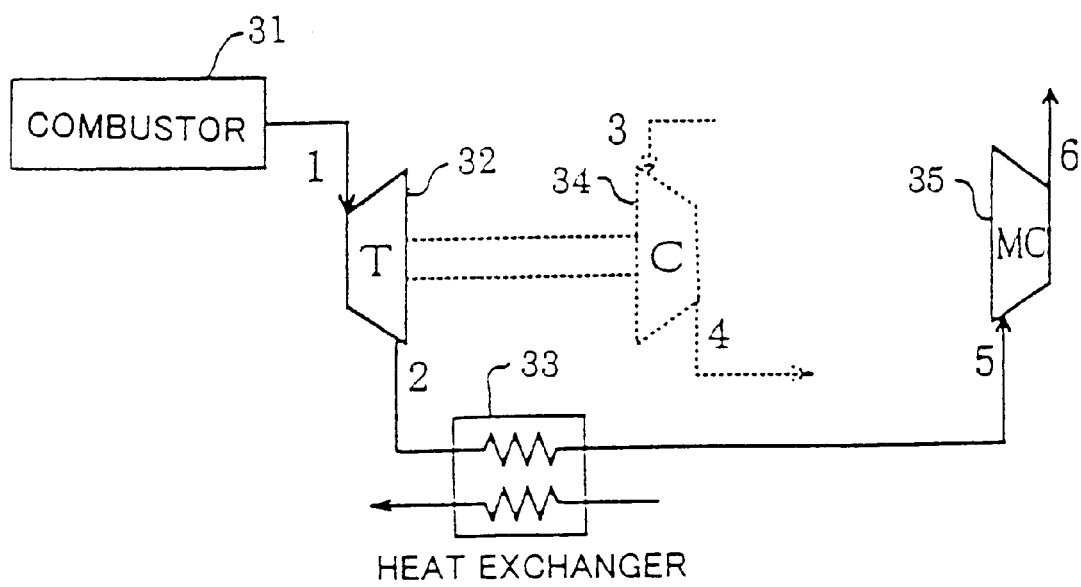
FIG. 8 is the test rig with pipe lines showing the principle of the power generating apparatus according to the present invention.

FIG. 8 is another explanatory view showing the principle of the power generating apparatus relating to the present invention. In the power generating apparatus of FIG. 8, the turbine T32 and compressor C34 are directly connected to each other. Exhaust gas of turbine T32 flows into the compressor C34 via the heat exchanger 33. By the gas flow, the compressor C34 directly connected to the turbine T32 acts as only power absorption. Similar to the aforementioned experimental example, high-temperature gas sent from the combustor of premixed gas of city gas and air was put into the turbine T32.

Figure 9:
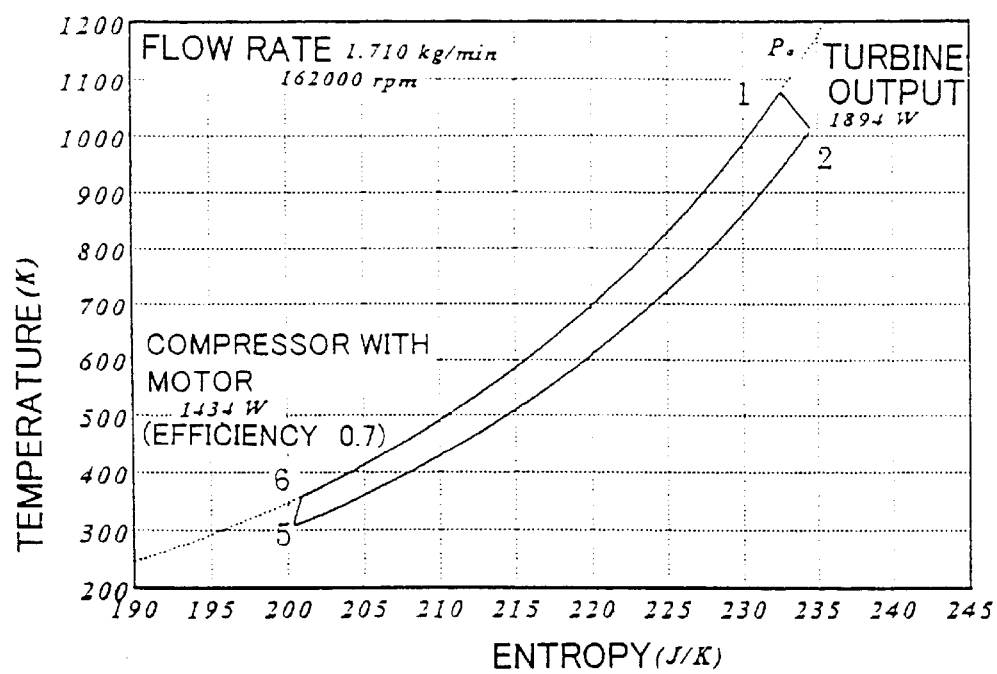
FIG. 9 is a typical example of the experimental data in terms of temperature and entropy for output confirmation in the power generating apparatus of FIG. 8.

FIG. 9 is a diagram of temperature and entropy for output confirmation in the power generating apparatus of FIG. 8. Numeric characters indicating the states in the figure correspond to reference numerals of FIG. 8. The output is associated with the temperature difference in the change of state. In FIG. 9, the output of turbine T32 is 1894 W(watts) (states 1 to 2), which exceeds the necessary horsepower 1434W of compressor C34 (states 5 to 6). For this reason, if the compressor MC 35 with an electric motor and turbine T32 are directly connected to each other, power is generated. Further, in FIG. 9, the efficiency of motored compressor is set to 70% based on the past experiment. This compressor is one that is composed of four centrifugal blower fans with an outer diameter of 120 mm, which are laid one on top of another, and this adiabatic efficiency is confirmed by another measurement.

In this experiment, no cooling was performed in order to increase the efficiency of compressor portion of the power generating apparatus of the apparatus in view of the cost, but this experiment demonstrated for the first time that the turbine was operated with high-temperature gas of less than atmospheric pressure to obtain shaft horsepower.

(4) Comparison and review of combined cycle system

Next, the characteristics of the invented heat engine is obtained by thermodynamic calculation, and compares the result with the performance attained by the prior art. First, in connection with the combined cycle system, the comparison with the prior art and thermodynamic calculation will be described.

Figure 10:
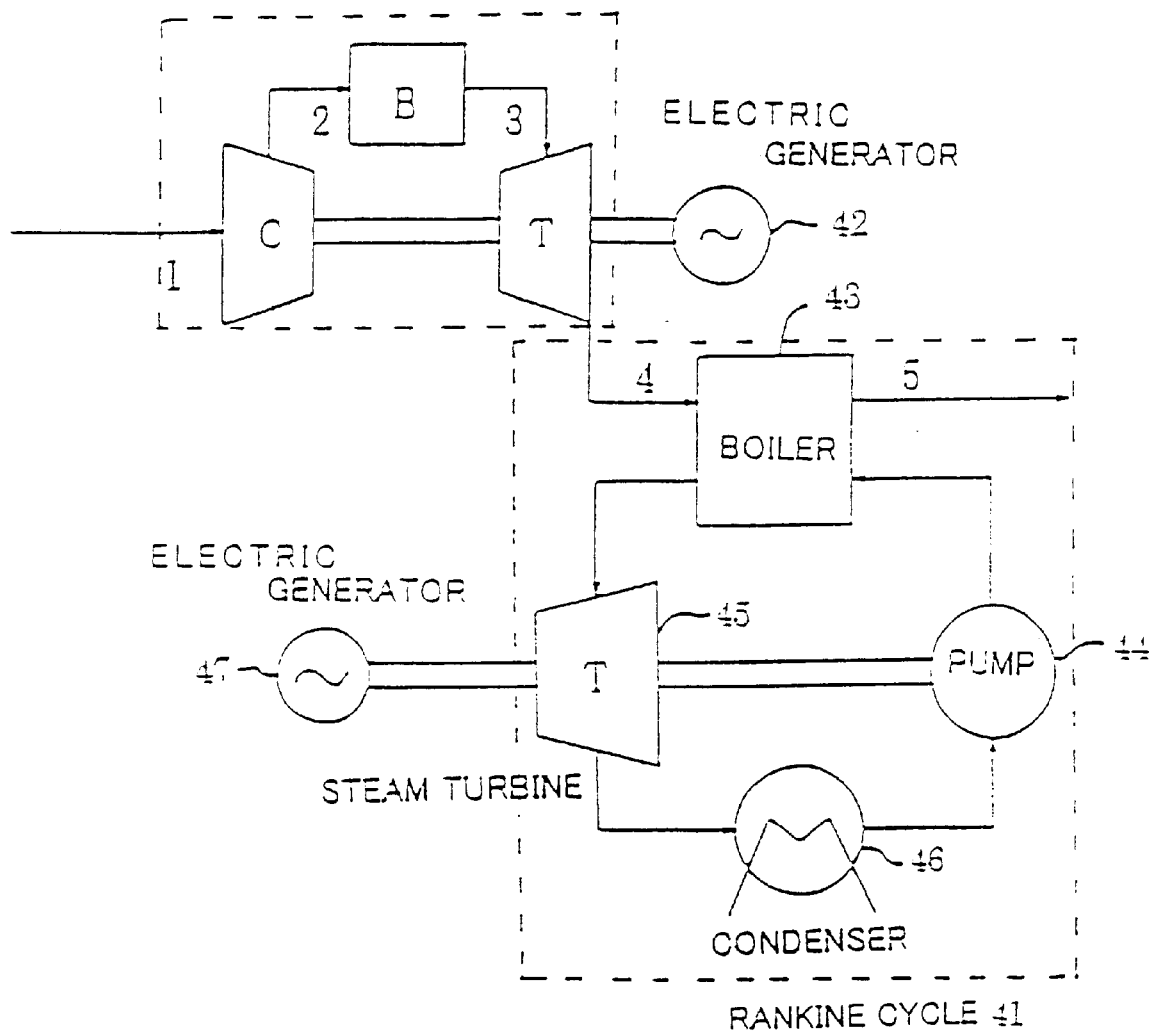
FIG. 10 is a conceptual view showing a conventional combined cycle system.

FIG. 10 is a structural view showing the conventional combined cycle system. This conventional combined cycle system has a gas turbine 40 and Rankine cycle 41. The gas turbine 40 comprises a compressor C, a combustor B, and a turbine T. The Rankine cycle 41 comprises a boiler 43, a pump 44, a steam turbine T 45 and a condenser 46. The gas turbine apparatus 40 is directly connected to an electric generator 42, and the Rankine cycle 41 is directly connected to an electric generator 47.

In the application of the present invention to the combined cycle system, the Rankine cycle 41 of FIG. 10, which has boiler 43, pump 44, condenser 46 and steam turbine T 45, may be removed and replaced by the aforementioned power generating apparatus.

Figure 11:
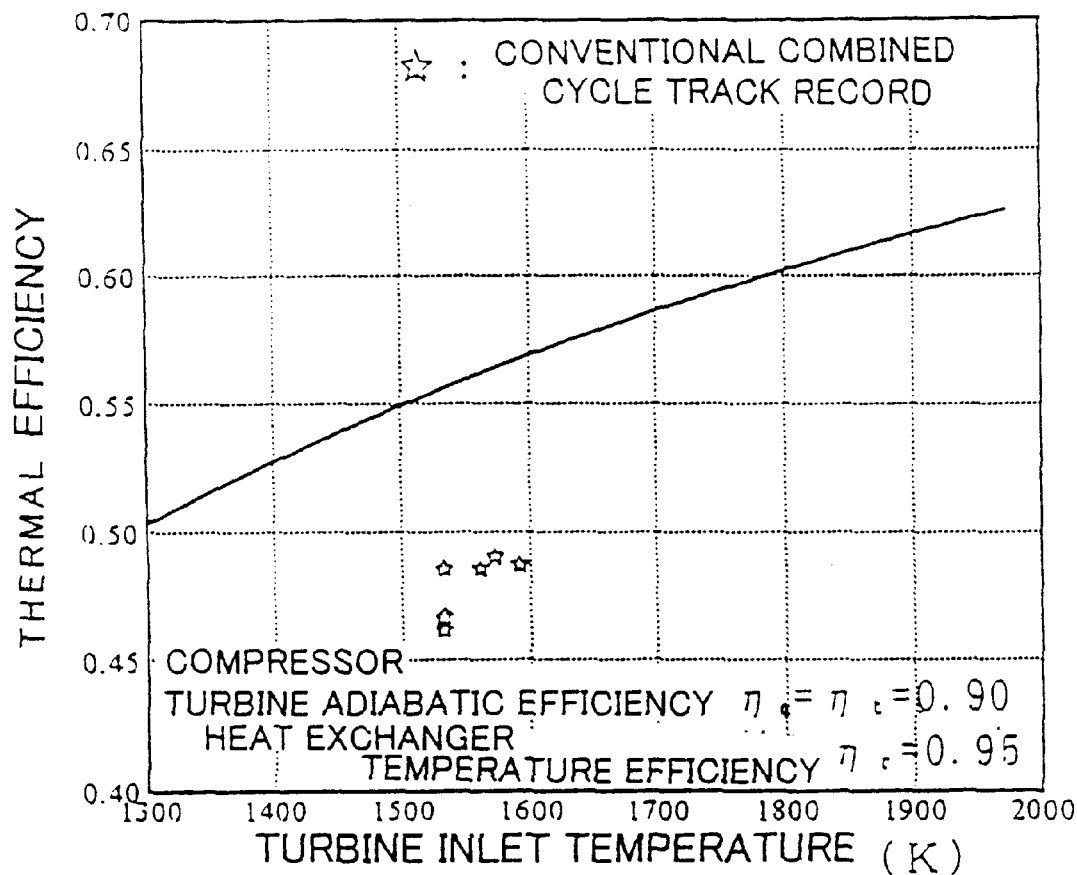
FIG. 11 is comparisons of thermal efficiency between the present invention made in calculations and track record of conventional combined cycle gas turbines published in the open literature.

FIG. 11 is a characteristic diagram of thermal efficiency of the present invention and that of the conventional combined cycle gas turbine. A solid line in the FIG. indicates thermal efficiency, when the power generating apparatus is cooled through three stages, as the turbine inlet temperature of topping cycle is changed. Herein, as one example, temperature efficiency of the heat exchanger was set at 95%, and adiabatic efficiency of all compressors and turbine were set at 90%. While in the combined cycle system, which has a track record on supplies in recent years, it has become common practice that the turbine inlet temperature is 1300° C. However, this turbine inlet temperature can be set at 1500° C. exceeding 1400° C. Conventional data announced in Japan was shown by asterisks. Data shown by these asterisks is one that is obtained from the conventional combined cycle system of FIG. 10. It is announced that the adiabatic efficiency is 90% or more in either of the compressor of gas turbine apparatus and turbine.

As illustrated in the figure, if the present invention is applied to the track record on thermal efficiency in the prior art, the efficiency can be increased by several %. In this comparison calculation, a pressure ratio 10, which is a little below the optimal pressure ratio of power generating apparatus, is used. In this case, if the axial flow velocity is set to the same as that of the gas turbine side and the outer diameter of the turbine of the power generating apparatus and the compressor. is set to the same as that of the gas turbine, the number of power generating apparatuses must be increased, for example ten. For this reason, if the pressure ratio is reduced to 4 as maintaining three stage cooling and is further shifted from the optimal value thereafter calculation is carried out again, the thermal efficiency indicated by the solid line of FIG. 11 drops by about 1%. In this case, for example, if the outer diameters of the turbo machines on the power generating apparatus, that is, the turbine T and compressor C are doubled, or the plurality of power generating apparatuses is provided as shown in FIG. 3, the outer diameters may be increased by only about 40%. However, the above explained one example of the maximum level in connection with the increase in the diameter, and there is possibility that the increase will be more restrained if it is designed in more detail.

Moreover, the reason three-stage cooling is used is that it is confirmed by the calculation that little effect can be expected even if cooling over three stages is performed. Additionally, in the calculation of thermal efficiency, the turbine inlet temperature on the gas turbine and the pressure ratio. of the power generating apparatus are fixed, and the pressure ratio on the gas turbine is sequentially changed so as to obtain the maximum point of thermal efficiency as the entirety of system.

Figure 12:
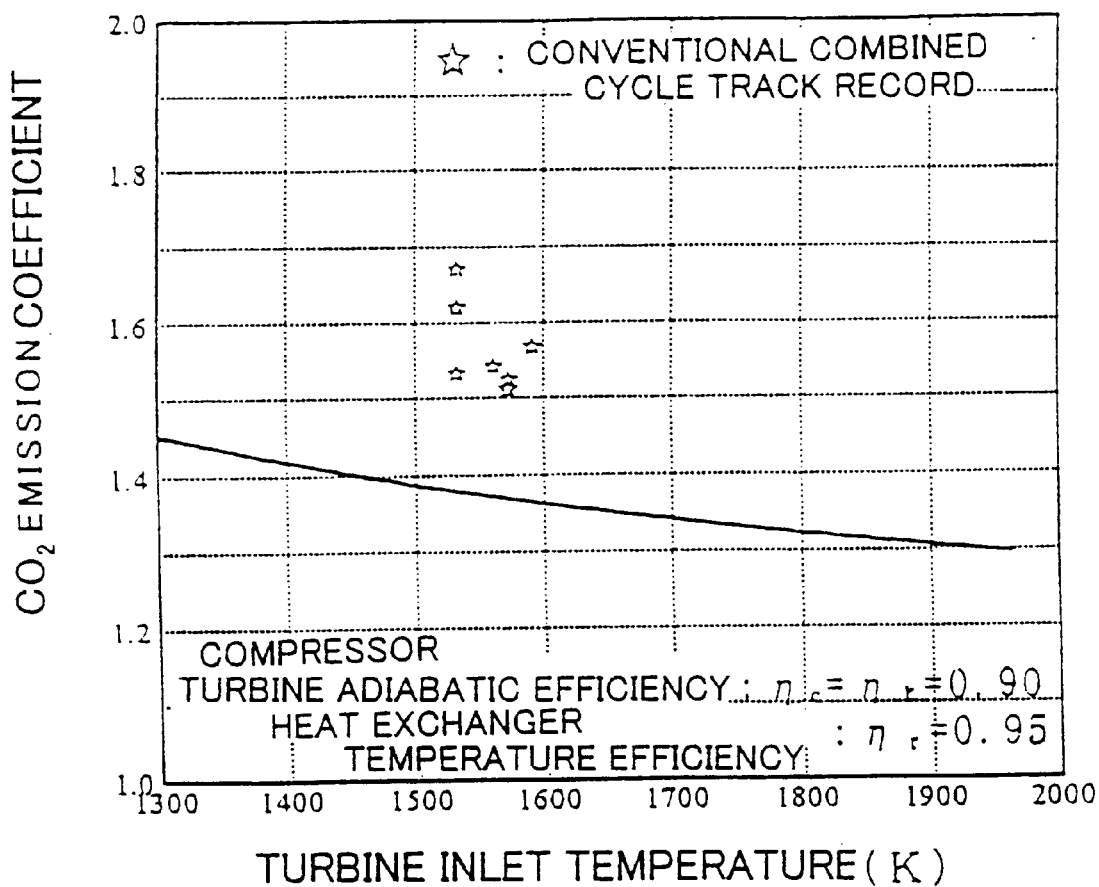
FIG. 12 is comparisons of the coefficient of emission of carbon dioxide gas between the present invention and conventional combined cycle gas turbines.

FIG. 12 shows coefficient of carbon dioxide gas exhaust the present invention and that of the conventional heat engine. FIG. 12 illustrates the carbon dioxide gas exhaust coefficient corresponding to the thermal efficiency of FIG. 11. In the figure, the solid line indicates the carbon dioxide gas exhaust coefficient in the present invention. This is one example in which the amount of generation of carbon dioxide gas of Carnot cycle, which is an ideal cycle engine, is set to 1, and this can be interpreted as a fuel consumption rate. On the other hand, asterisks indicate the track records in the prior art. As illustrated, the amount of carbon dioxide gas exhaust can be reduced by several percents.

(5) Comparison and review of regeneration cycle system

Next, in connection with the regeneration cycle system, the comparison with the prior art and thermodynamic calculation were carried out.

Figure 13:
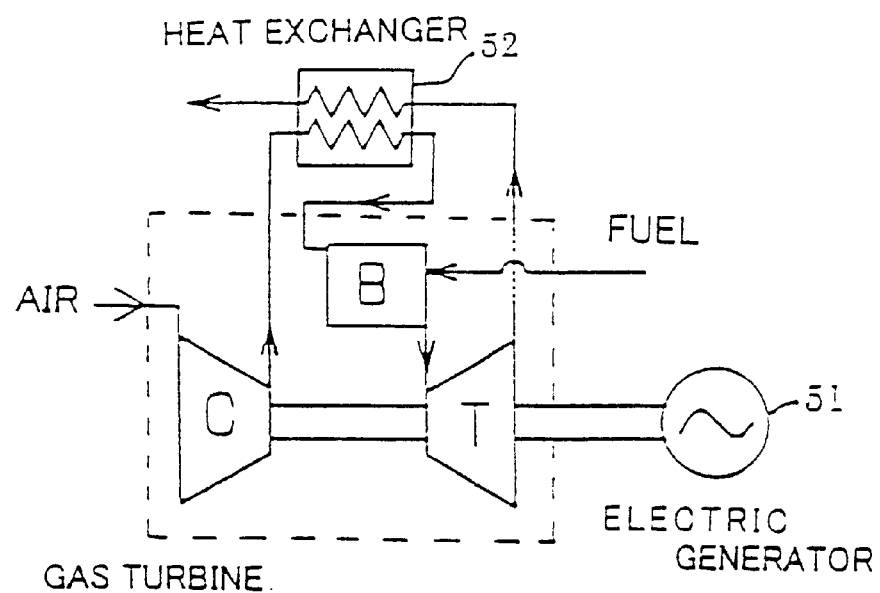
FIG. 13 is the regeneration cycle system by the conventional method.

FIG. 13 is a structural view of the regeneration cycle system according to the prior art. This regeneration cycle system comprises a gas turbine 50, a power generator 51, and a heat exchanger 52. The gas turbine 50 has a compressor C, a combustor B, and a turbine T. The conventional regeneration cycle system returns heat energy of high-temperature exhaust gas to the air after the compressor to save the fuel consumption rate. In other words, the conventional regeneration cycle system heats flow gas in front of the combustor B to high temperature to reduce fuel, thus improving the efficiency. The present invention greatly differs from the prior art in the following point. In the prior art, the exhaust heat is recovered in the form of heat energy, while in the present invention, it is performed in the form of power. Specifically, in the present invention, horsepower is generated by the power generating apparatus so as to increase the efficiency. Then, the power generating apparatus of the present invention can be operated as a regenerator for gas turbine in place of the regeneration cycle system of FIG. 13.

Figure 14:
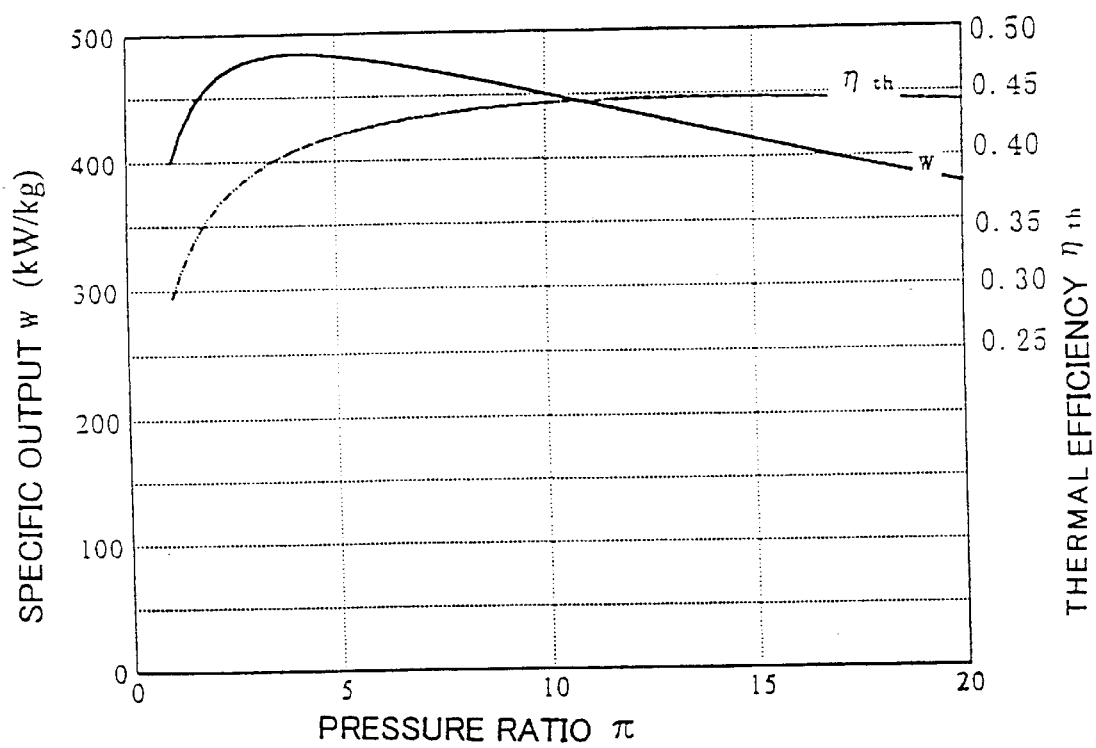
FIG. 14 is a typical example of characteristics of specific output and thermal efficiency as the pressure ratio changes in the present invention.

FIG. 14 is a characteristic diagram of a specific output and thermal efficiency in the heat engine relating to the present invention. In the figure, a solid line indicates a specific output W and a broken line indicates a thermal efficiency η th. FIG. 14 shows how the thermal efficiency and specific output of the heat engine of the present invention are changed by the pressure ratio when the temperature efficiency of heat exchanger is set at 95% and the power generating apparatus is set at an optimal pressure ratio. Moreover, in the recent gas turbine the possibility of using 1400° C., namely 1673K (Kelvin), or more as a turbine inlet temperature has been increased as air-cooling technology progresses. For this reason, in this calculation, the turbine inlet temperature was set at 1673K and the adiabatic efficiencies of compressor and turbine were set to 80% and 85%, respectively.

Figure 15:
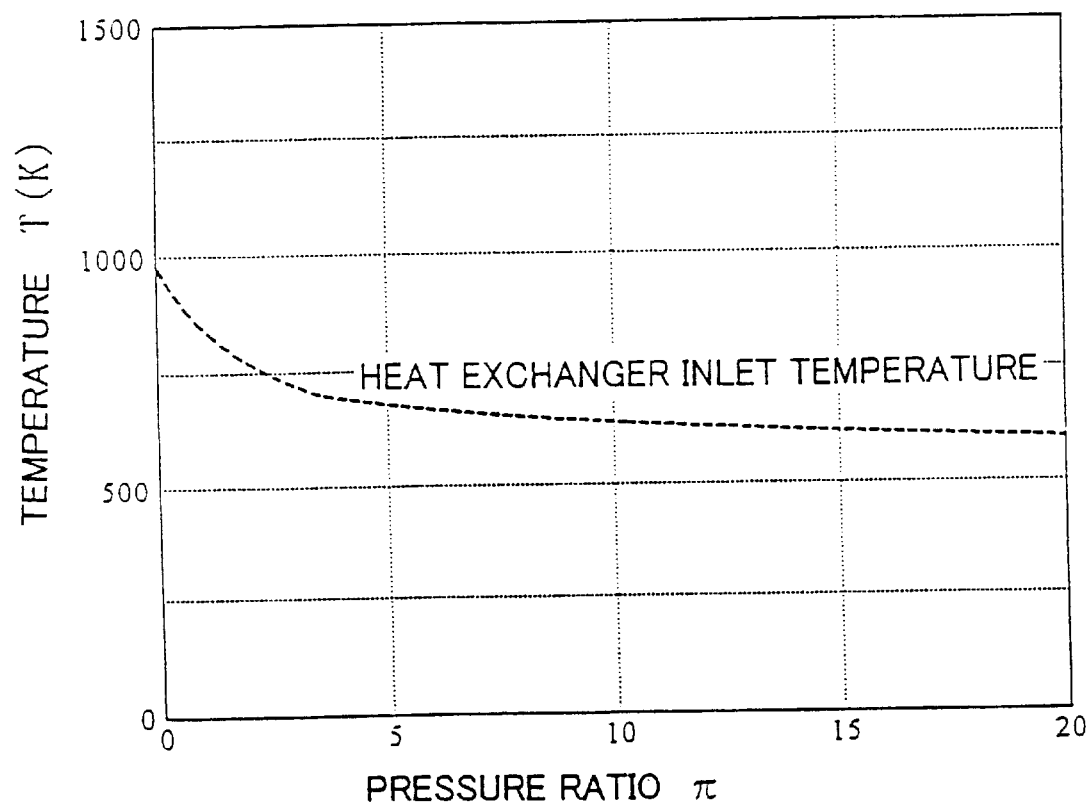
FIG. 15 shows the relationship between a heat exchanger inlet temperature and pressure ratio corresponding to FIG. 14 in the present invention.

FIG. 15 shows the characteristic diagram of the heat exchanger inlet temperature and the pressure ratio of the conventional gas turbine according to the present invention. FIG. 15 illustrates the heat exchanger inlet temperature corresponding to FIG. 14. In this case, the adiabatic efficiency of the turbo machine of the power generating apparatus is set to the same as that of the gas turbine . As is seen from FIG. 14, the maximum thermal efficiency 45% of the heat engine of the present invention is obtained at the pressure ratio close to 15. It should be noted that, as is read from FIG. 15, the heat exchanger inlet temperature stays at about 725K at the pressure ratio 15. This temperature can be sufficiently supported by the general low-cost heat exchanger which is made of metal, and a high temperature difference close to the environmental temperature can be used, so that high temperature efficiency of about 95% can be maintained. However, in this case, one-stage cooling is adopted and the power generating apparatus is used on the basis of the calculation in which the optimal pressure ratio is 5. If three-stage cooling is adopted, additional 1% improvement of efficiency can be expected, but the optimal pressure ratio becomes 8 and the outer diameter of the power generating apparatus is increased.

Figure 16:
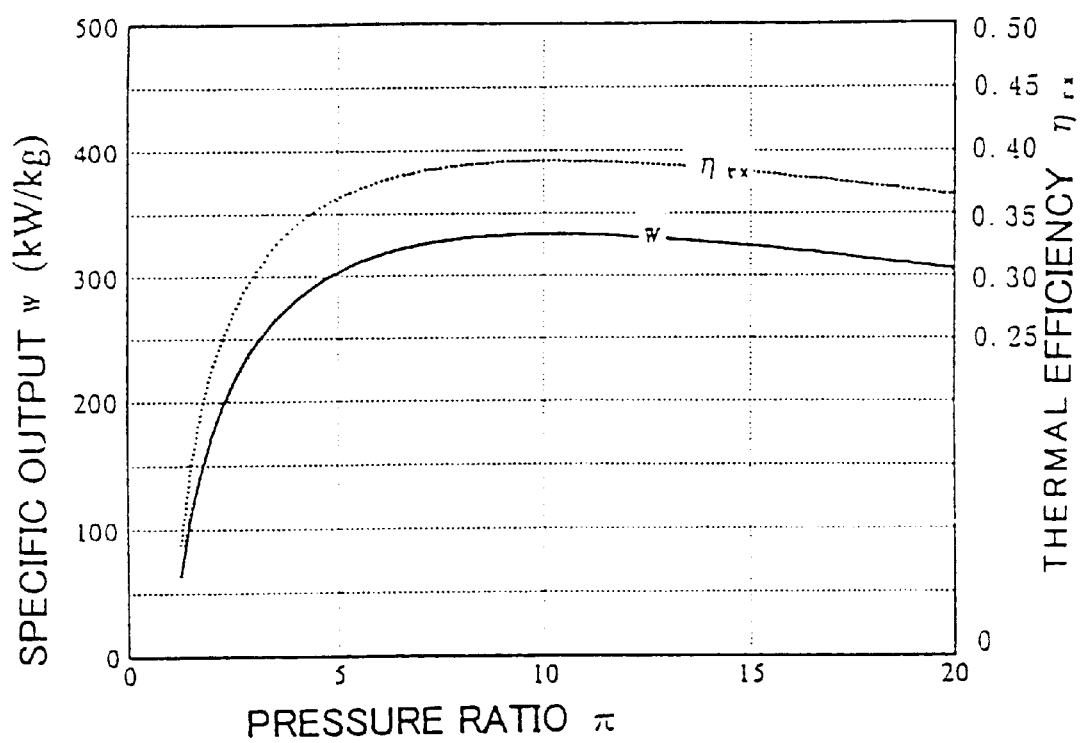
FIG. 16 is the characteristics of specific output and thermal efficiency as the pressure ratio changes in the conventional regenerative gas turbine.
Figure 17:
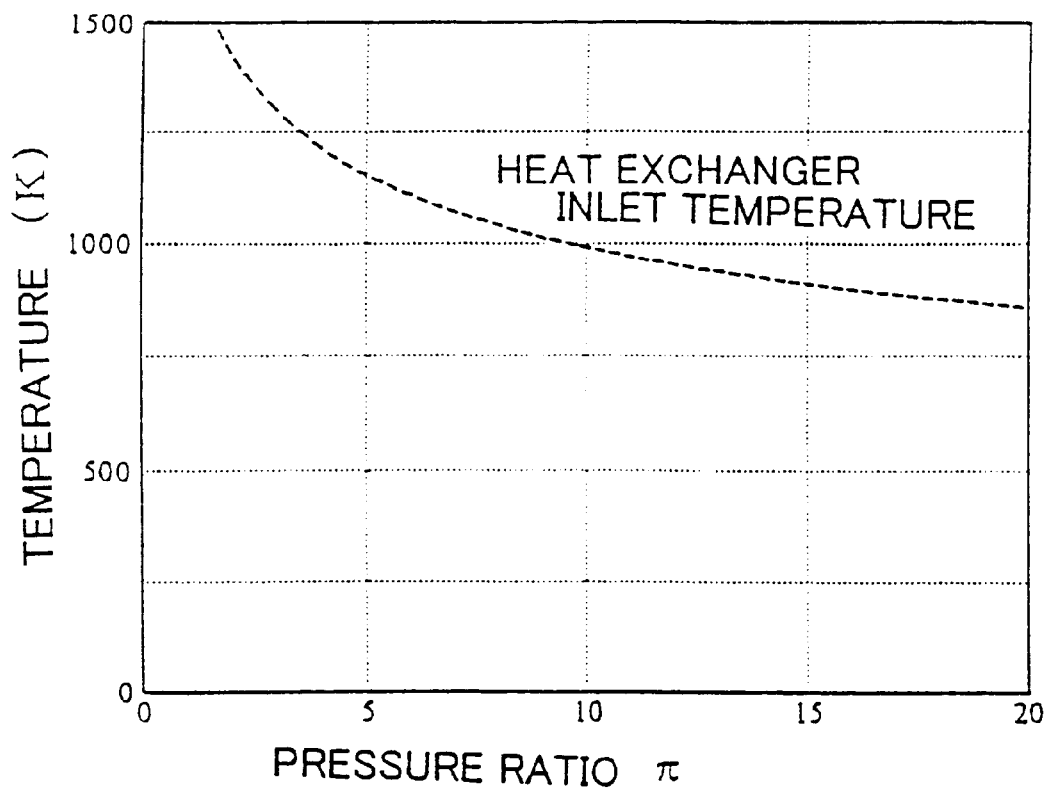
FIG. 17 shows the relationship between the heat exchanger inlet temperature and the pressure ratio of the conventional regenerative gas turbine.

FIG. 16 is a characteristic diagram of the specific output of the gas turbine apparatus of the conventional regeneration cycle system and the thermal efficiency. In the figure, a solid line indicates a specific output W and a dotted line indicates a thermal efficiency η rx. In addition, FIG. 17 is a characteristic diagram of the heat exchanger inlet temperature of the conventional regeneration cycle system as the pressure ratio changes. The results obtained by the conventional regeneration cycle system in the calculation conditions are set to the same as those of the present invention are illustrated in FIGS. 16 and 17.

As can be seen from FIG. 16, the thermalt efficiency becomes a maximum value of 38% at the pressure ratio of 10. The heat exchanger inlet temperature becomes 1000K at the pressure ratio of 10 from FIG. 17, and the temperature efficiency of about 50% is considered under such a high-temperature heat exchange in the technique at the present time. This is because expensive heat-resistant material is poor in heat conductivity and only a low temperature difference up to the compressor outlet can be used. As a result, in the calculation example, the thermal efficiency can be improved from the conventional value of 38% to 45% by the present invention. In the above comparison, if the pressure ratio of the power generating apparatus is shifted from the optimal value of 5 and is set to 4 and the increase in the outer diameters of the turbine and compressors is suppressed to about two times, the thermal efficiency is reduced by about 1%.

The description so far lies in the point that the outer diameters such as turbine are suppressed. However, when the size of the gas turbine is small, the diameter of the power generating apparatus can be increased and scale effect is added so that the adiabatic efficiency of components can be increased as compared with that of the gas turbine. In other words, the values of the component efficiency of the gas turbine and power generating apparatus are set uniformly in the calculation so far. However, in the small-sized gas turbine, the outer diameter of the turbo machine of power generating apparatus is increased to bring the pressure value closer to an optimal value and the scale effect can be obtained. This makes it possible to exert the property of the present invention more strongly, which can obtain the high heat efficiency on the whole.

(6) Third embodiment

Figure 18:
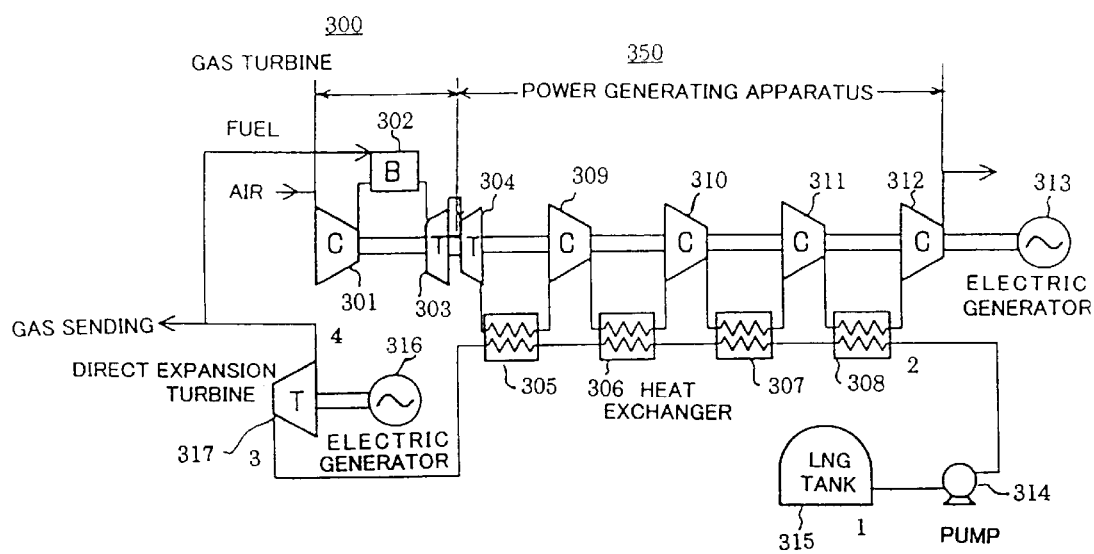
FIG. 18 is a constitutional view of a third embodiment of the heat engine according to the present invention.

FIG. 18 is a constitutional view of a third embodiment of the heat engine according to the present invention. This heat engine is applied to the manufacturing of vaporized natural gas, and comprises a gas turbine 300, a power generating apparatus 350, power generators 313 and 316, a pump 314, an LNG tank 315, and a direct expansion turbine 317. The gas turbine 300 includes a compressor 301, a combustor 302 and a turbine 303. The power generating apparatus 350 includes a turbine 304, compressors 309 to 312 and heat exchangers 305 to 308. The compressor 312 is directly connected to the power generator 313. The shafts of gas turbine 300 and power generating apparatus 350 may be separately provided to be independent of each other. In addition, the direct expansion turbine 317, which is connected to the heat exchanger 305, is directly connected to the power generator 316. As can be seen from the figure, the gas turbine 300 and power generating apparatus 350 use the same concept as the constitutional view of FIG. 1. Here, the cooling of the compressor section of power generating apparatus 350 is carried out with liquefied natural gas (commonly called LNG), and both gasification and power generation are carried out with the exhaust heat of gas turbine 300. Note that the position of the constitution of power generation may be changed or omitted as required. A part of gas is used as fuel of gas turbine 300. Moreover, in the present system, since there is a sufficient exhaust gas heat source, direct expansion of LNG can be also used.

Figure 19:
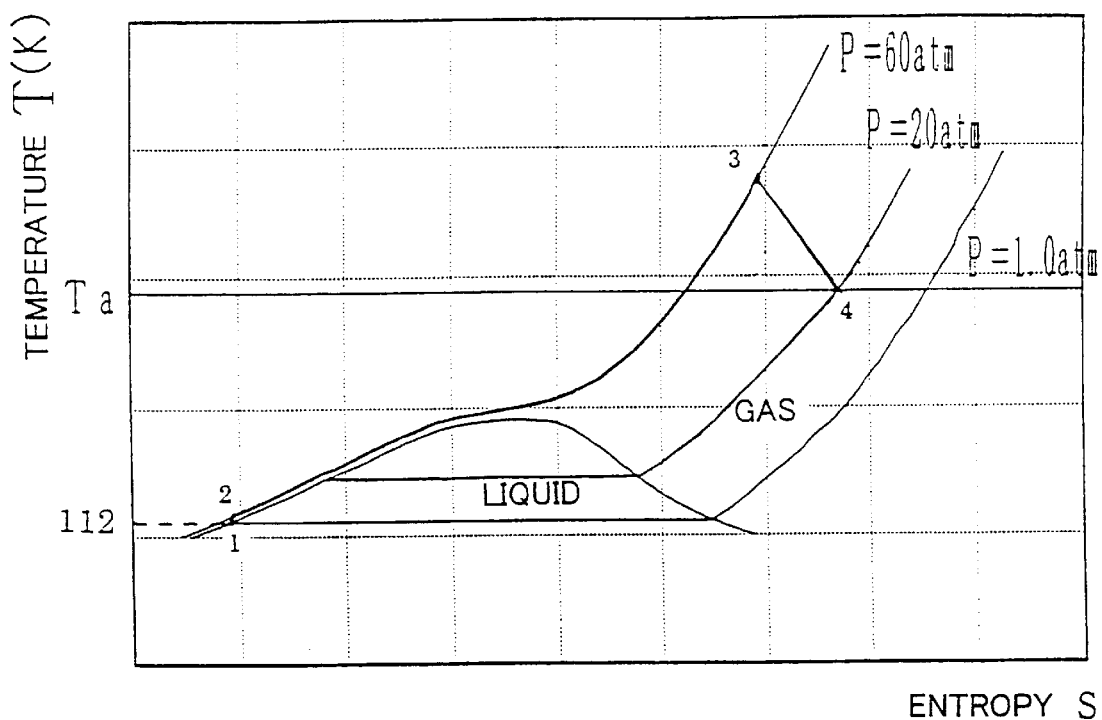
FIG. 19 is a temperature/entropy diagram of an expansion process of a direct expansion turbine according to the present invention.

FIG. 19 is a temperature/entropy diagram of an expansion process of a direct expansion turbine according to the present invention. Numeric FIGS. 1 to 4 in FIG. 19 correspond to state numbers of gas corresponding to FIG. 18, respectively. In general, LNG is carried at 1 atmospheric pressure. This state is expressed by state 1 in the figure. This is pressurized to about 60 atmospheric pressure by, for example, the pump (state 2), heated (state 3), and put into the direct expansion turbine. At this time, the amount of LNG is determined such that the temperature is returned to substantially environmental temperature Ta. Normally, gasified natural gas is sent to a user at the gas pressure of about 20 times atmospheric pressure (atm pressure).

Figure 20:
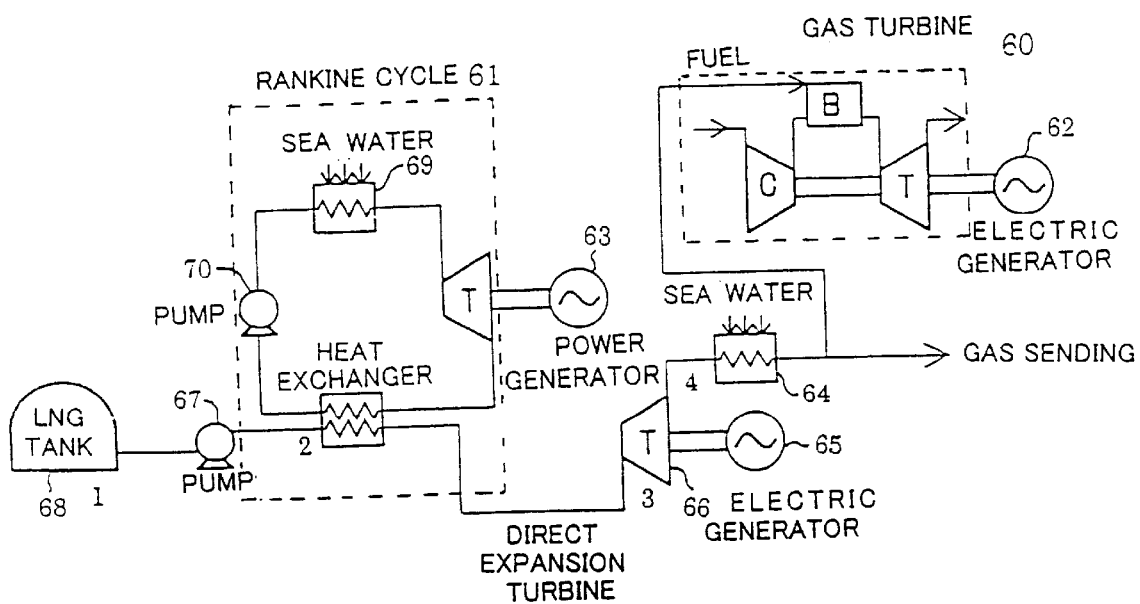
FIG. 20 is a constitutional view according to the present invention in which a gas turbine 60 is added to the conventional system for comparisons with the present invention.

FIG. 20 is a constitutional view according to the present invention in which a gas turbine 60 is added to the conventional system. Generally, LNG cryogenic power generation is carried out using about 180 degrees of a temperature difference between sea water and LNG at a Rankine cycle on condition that Freon is used as a working medium. The system that is currently in operation does not use the gas turbine apparatus. However, in order to make a comparison with the present invention, the gas turbine apparatus using the same amount of fuel is temporarily inserted to the figure. This system is constituted of a gas turbine 60, a Rankine cycle 61, power generators 62, 63 and 65, a condenser 64, a direct expansion turbine 66, a pump 67, and an LNG tank 68. Such system that uses sea water employs the direct expansion turbine 66 in combination. However, since the heat source is sea water, sea water is poured onto state 4, which has been passed through the turbine, and the temperature must be returned to the environmental temperature by use of the heat exchanger 64. Therefore, the present invention as illustrated in FIG. 18 has an advantage in this point. In this case, the quantity of electricity necessary for the pump is not considered since it is extremely small as compared with the entire quantity of electricity generated.

Next, LNG cryogenic power generation output, quantity of gasified natural gas manufactured and the system, which are published by representative domestic electric power and gas companies A, B and C are shown below:

|  | LNG cryogenic power generation (kW) | Quantity of delivered gas (kg/s) | System |
| --- | --- | --- | --- |
| Company A | 8000 | 47 | Direct expansion and Rankine |
| Company B | 4000 | 28 | Rankine |
| Company C | 8500 | 42 | Direct expansion and Rankine |

Then, from the above data, data according to the present invention are set to be the same as the quantity of delivered gas and the fuel flow rate of the gas turbine were compared and calculated. An imaginary gas turbine added to the conventional system has the maximum efficiency, which is desirable at the present time, at the turbine inlet temperature of 1500° C., optimal pressure ratio of 40 and heat efficiency rate of 49%. The reason why such an assumption is set is that the present invention is made based on the gas turbine.

Figure 21:
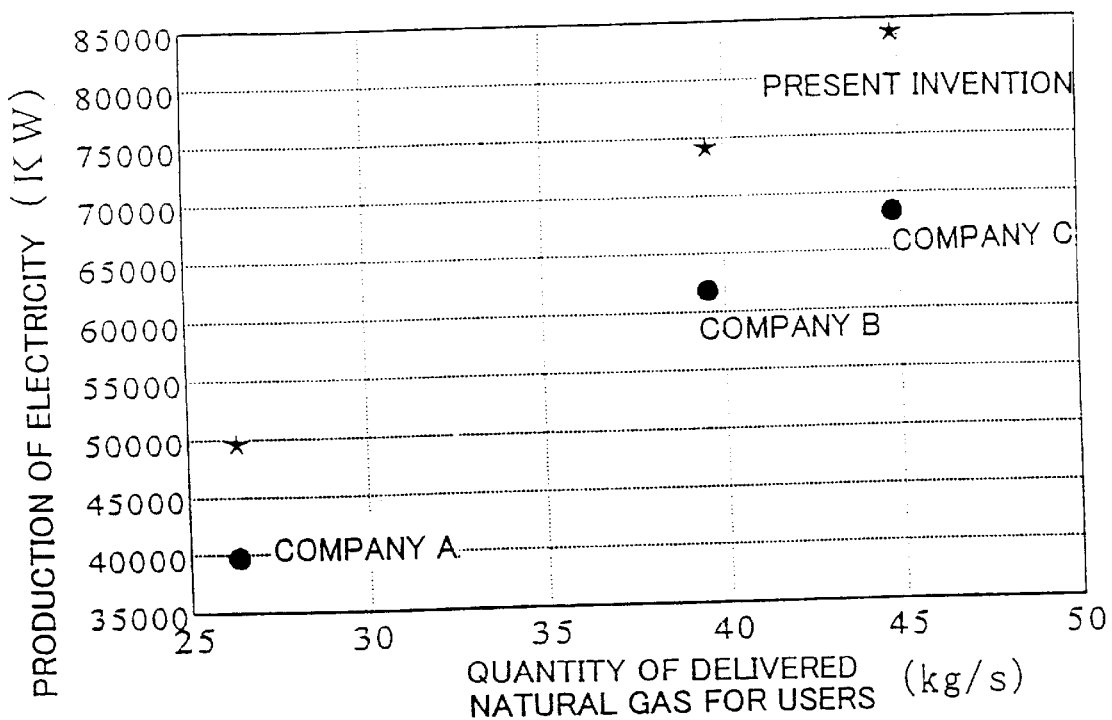
FIG. 21 is an explanatory diagram showing the comparison in quantity of electricity generated between the present invention and published data of three companies.
Figure 22:
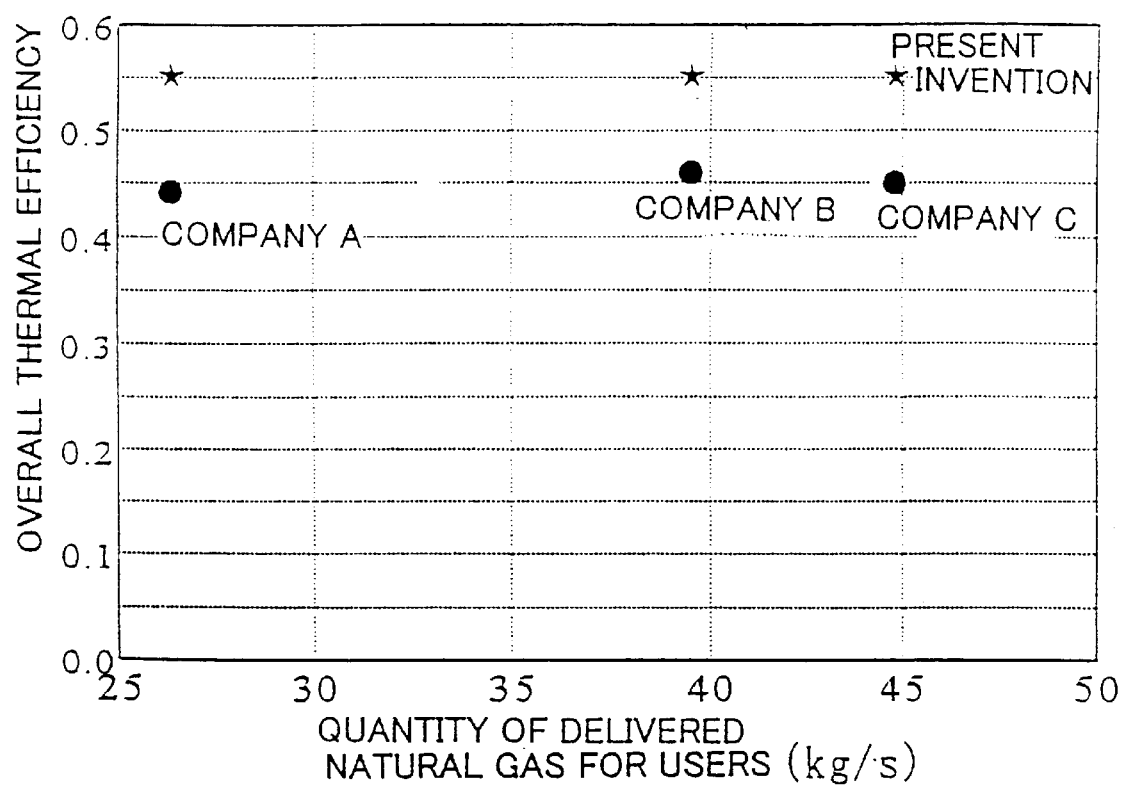
FIG. 22 is an explanatory diagram showing the comparison in overall thermal efficiency between the present invention and published data of three companies.

FIG. 21 is an explanatory diagram showing the comparison in quantity of electricity generated between the present invention and the announced data of three companies. Additionally, FIG. 22 is an explanatory diagram showing the comparison in overall thermal efficiency between the present invention and announced data of the three companies.

These figures show the comparison between the heat engine using the present invention and the conventional system in connection with the quantity of electricity generated and the overall thermal efficiency. In addition, the adiabatic efficiencies of the compressor and turbine were all set at 85% as one example. When the quantity of electricity generated is the. same scale, the present invention can increase the produced electricity by 17% as compared with the conventional system using Rankine cycle if the quantity of delivered natural gas for users for users is the same. Viewing this fact from the thermal efficiency, the quantity of electricity generated is 10% higher than the conventional system. From the viewpoint of the use of LNG, it is possible to make good use of energy stored at low temperature. The above-described comparison does not include energy which is necessary for heating sea water whose temperature dropped at the time of the conventional system and returning it to the sea. In this case, the pressure ratio of the power generating apparatus is set to 10, but more realistic case can be considered if the pressure ratio is reduced to 4. Then, as described in the combined cycle, the heat efficiency of about 1% drops below the asterisks shown in FIG. 22.

Figure 23:
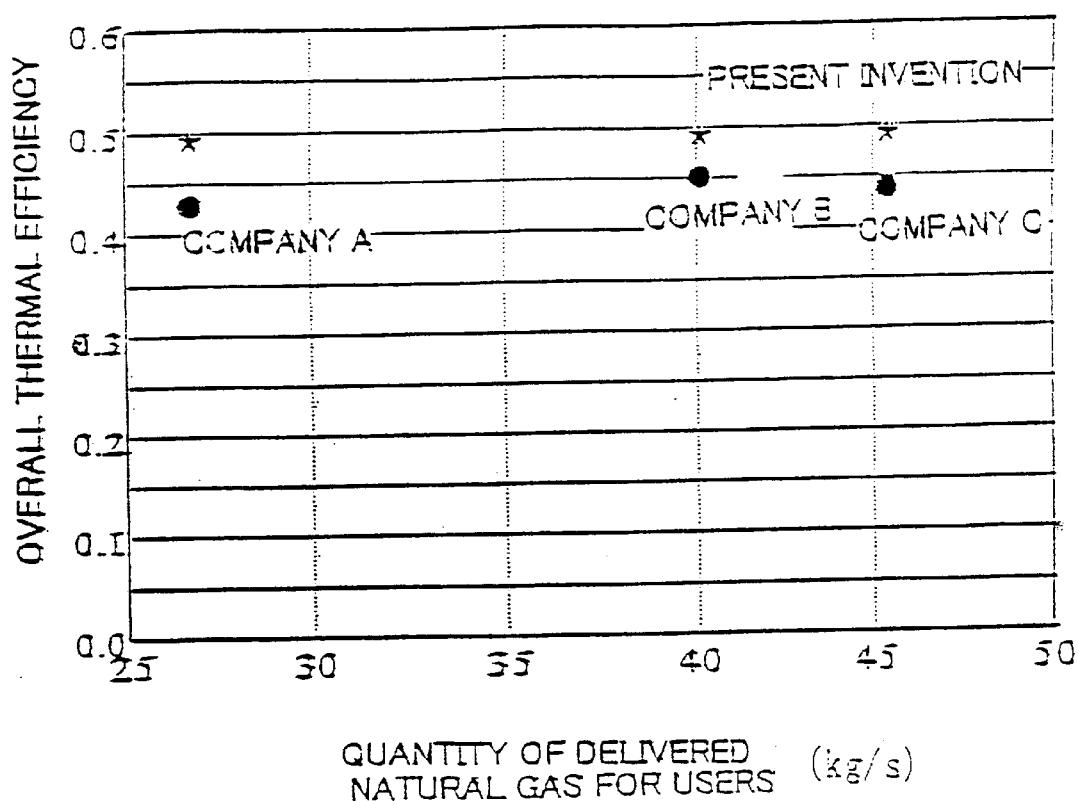
FIG. 23 is an explanatory diagram showing the comparison in overall thermal efficiency between the present invention and published three companies.

FIG. 23 is an explanatory diagram showing the comparison in overall thermal efficiency between the present invention and the announced three companies. It is FIG. 23 that shows the result, which is obtained by setting the pressure ratio of the power generating apparatus at 2 and performing the above-described calculation to examine the range of reduction in efficiency. At this time, there is little need to increase the diameter of turbo machine if considering a design such as a case where the compressor inlet diameter of the power generating apparatus is increased a little more than that of the gas turbine. The overall thermal efficiency is slightly reduced as compared with the case where the pressure ratio of power generating apparatus is high, but the predominance of the present invention can be maintained.

As described above, if the combined cycle system (exhaust heat energy from the gas turbine is converted to steam via water, the steam turbine is rotated, and both Brayton cycle and Rankine cycle are used in combination) is constituted as in the present invention, there will be no need for providing the steam turbine which requires enormous cost and facilities for generating high-temperature steam. If the normal gas turbine is positive, the power generating apparatus is negative. Therefore, two positive and negative gas turbines may be connected to each other. In terms of cycle, operation is performed at two cycles which are Brayton cycle and inverted Brayton cycle, so that high-temperature hot water, which could not be expected at the conventional Rankine cycle, can be obtained as a by-product, and can be used in hot water supply and heating. The use of the present invention as a cogeneration system can suppress thermoelectric ratio low since the power generation efficiency is high and can be employed as means for solving a mismatch problem of the thermoelectric ratio, which has been the obstacle to the widespread use for the conventional consumer system named as co-generation. Then, in the present invention, the load to be put on the environment is smaller than the conventional system.

Additionally, according to the present invention, the heat exchanger can be replaced by the conventional boiler facilitates, and this brings about a large difference in the content regarding the cost though there is little difference in the occupied capacity. Namely, in the heat exchanger of the present invention, numerous thin water tubes may be arranged in the pipe with a large diameter through which high-temperature gas passes and the temperature range of hot water is between 100° C. and the environmental temperature, and low-cost material can be used. On the contrary, the conventional boiler facilities must generate steam of about 600° C., and becomes expensive in cost and maintenance.

In the regeneration cycle system (the system that returns exhaust heat energy of the turbine to the compressor outlet in the relatively small-sized gas turbine apparatus and the like), if the present invention is applied, the temperature of gas flowing into the heat exchanger becomes low and lower-cost material can be used. While, according to the present invention, since the range of temperature at which heat exchange is performed expands to the environmental temperature level as compared with the conventional system, high conversion efficiency can be expected. In conventional system, fuel consumption rate is suppressed by regeneration without changing the output, while, in the present invention, the efficiency is improved by an increase in the output without changing the fuel consumption rate. For this reason, if the output is maintained as it is, the miniaturization of machine can be achieved. Since the present invention can perform heat exchange with almost no change in the flow direction of working fluid, no difficulty occurs in the structure and generated loss of fluid is little. Moreover, in the present invention, hot water can be obtained as a by-product if the environment is one that can use water for heat exchange. If the pressure ratio of the gas turbine becomes high, the conventional system cannot be used. However, according to the present invention, there is no limitation in the pressure ratio. In the present invention, there is a tendency for the diameter of the turbine of the power generating apparatus to increase, but this tendency can be contrarily exploited for the application to the small-sized gas turbine. In other words, the outer diameters of the turbine of power generating apparatus and the compressor are increased as large as possible by bringing the pressure value closer to an optimal value, so that the element efficiency, which is higher than the small-sized gas turbine can be used by the scale effect, resulting in improvement of the heat efficiency on the whole.

The use of heat engine vaporized natural gas manufacturing of the present invention eliminates the need for sea water unlike the prior art, and power generation and gasification can be simultaneously carried out at the thermal efficiency which is about 10% higher than the conventional case. When the quantity of electricity generated is the same scale, the present invention can increase the produced electricity by 17% as compared with the conventional system if the quantity of delivered gas is the same, and it is possible to make good use of low-temperature energy stored in liquefied natural gas. Moreover, in the conventional system, extra energy is needed to return the temperature of used sea water to the original temperature in order to protect the ecosystem. However, since the present invention does not use sea water, such energy is unnecessary.

Additionally, in the manufacture of the present invention, the current gas turbine technology, which has been already established, can be directly used in the power generating apparatus. Though the compressor of the power generating apparatus. is operated under the low pressure of about 0.25 atmospheric pressure, this range has already been experienced in the aero-engine, and there is need to provide aerodynamic design in consideration of Reynolds number.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A heat engine, comprising:
   a gas turbine, comprising:
      a first compressor, which compresses air,
      a combustor, which heats the air causing it to expand, and
      a first turbine, through which the heated, compressed air passes, thereby reducing the pressure of the air to at or about atmospheric pressure; and
   a power generating apparatus, comprising:
      a second turbine, which receives the air from said first turbine, and which draws in the air from said first turbine by a negative pressure created downstream of the second turbine by a second compressor;
      a cooler, into which the air is drawn from said second turbine, by the negative pressure created by the second compressor, to perform heat exchange, thus reducing the temperature of the air to at or about environmental temperature;
      the second compressor, into which the air is drawn from said cooler, the second compressor being comprised of a plurality of compressor portions, with a heat exchanger provided between each of the plurality of compressor portions, each of the compressor portions compressing the air, and each of the heat exchangers bringing the air to at or about atmospheric temperature, the second compressor thereby creating a negative pressure upstream of the second compressor, and discharging the air to atmosphere from a final compressor portion of the second compressor at or about atmospheric pressure; and
      a power generating apparatus rotating shaft, operably connecting the second gas turbine with the plurality of compressor portions of the second compressor.

2. The heat engine according to claim 1, wherein said gas turbine is provided with a gas turbine rotating shaft, and wherein said power generating apparatus rotating shaft is operably connected to the gas turbine rotating shaft.

3. The heat engine according to claim 1, wherein a gas turbine rotating shaft and the power generating rotating shaft operate independently.

4. The heat engine according to claim 1, wherein said second compressor comprises four compressor portions and three heat exchangers, and wherein the second and third compressor portions and the three heat exchangers comprise an intercooling portion.

5. The heat engine according to claim 1, comprising a plurality of said power generating apparatuses, and a plurality of diffusers for linking said gas turbine with each of said plurality of said power generating apparatuses.

6. The heat engine according to claim 1, wherein liquefied natural gas is supplied to said power generating apparatus, wherein said cooling process performed by said cooler and said heat exchangers vaporizes the liquefied natural gas, and wherein said power generating apparatus generates electricity, causing a part of said vaporized natural gas to flow into said gas turbine.

7. The heat engine according to claim 2, wherein the gas turbine rotating shaft and the power generating apparatus rotating shaft comprise the same rotating shaft.

* * * * *